United States Patent [19]

Farrington et al.

[11] 3,953,230
[45] Apr. 27, 1976

[54] SEALED LITHIUM-PHOSPHOROUS CELL

[75] Inventors: Gregory C. Farrington, Elnora; Walter L. Roth, Schenectady, both of N.Y.

[73] Assignee: General Electric Company, Schenectady, N.Y.

[22] Filed: Apr. 25, 1975

[21] Appl. No.: 571,500

[52] U.S. Cl. .............................. 136/6 LN; 136/20; 136/100 R; 136/153
[51] Int. Cl.² ...................................... H01M 10/00
[58] Field of Search ................. 136/6 LN, 6 FS, 20, 136/100 R, 153

[56] References Cited
UNITED STATES PATENTS

| 3,573,105 | 3/1971 | Weininger et al. | 136/86 |
| 3,713,897 | 1/1973 | Liang | 136/153 |

OTHER PUBLICATIONS

"Progress in Solid State Chemistry," Reiss & McCaldin, Vol. 7, 1972, pp. 149-151.

*Primary Examiner*—John H. Mack
*Assistant Examiner*—C. F. LeFevour
*Attorney, Agent, or Firm*—Paul R. Webb, II; Joseph T. Cohen; Jerome C. Squillaro

[57] ABSTRACT

A sealed lithium-phosphorous cell for ambient temperature operation is described which comprises a casing, an anode positioned within the casing, the anode selected from the class consisting of lithium, lithium as an amalgam, and lithium in a nonaqueous electrolyte, a cathode positioned within the casing, the cathode comprising of phosphorous in a nonaqueous electrolyte with an ionic conductivity enhancing material, and a solid lithium-sodium aluminate electrolyte positioned within the casing between the anode and cathode and in contact with both the anode and cathode, the solid lithium-sodium aluminate electrolyte having an approximate composition of $LiNaO \cdot 9Al_2O_3$ of which 1.3 to 85% of the total alkali ion content is lithium.

3 Claims, 3 Drawing Figures

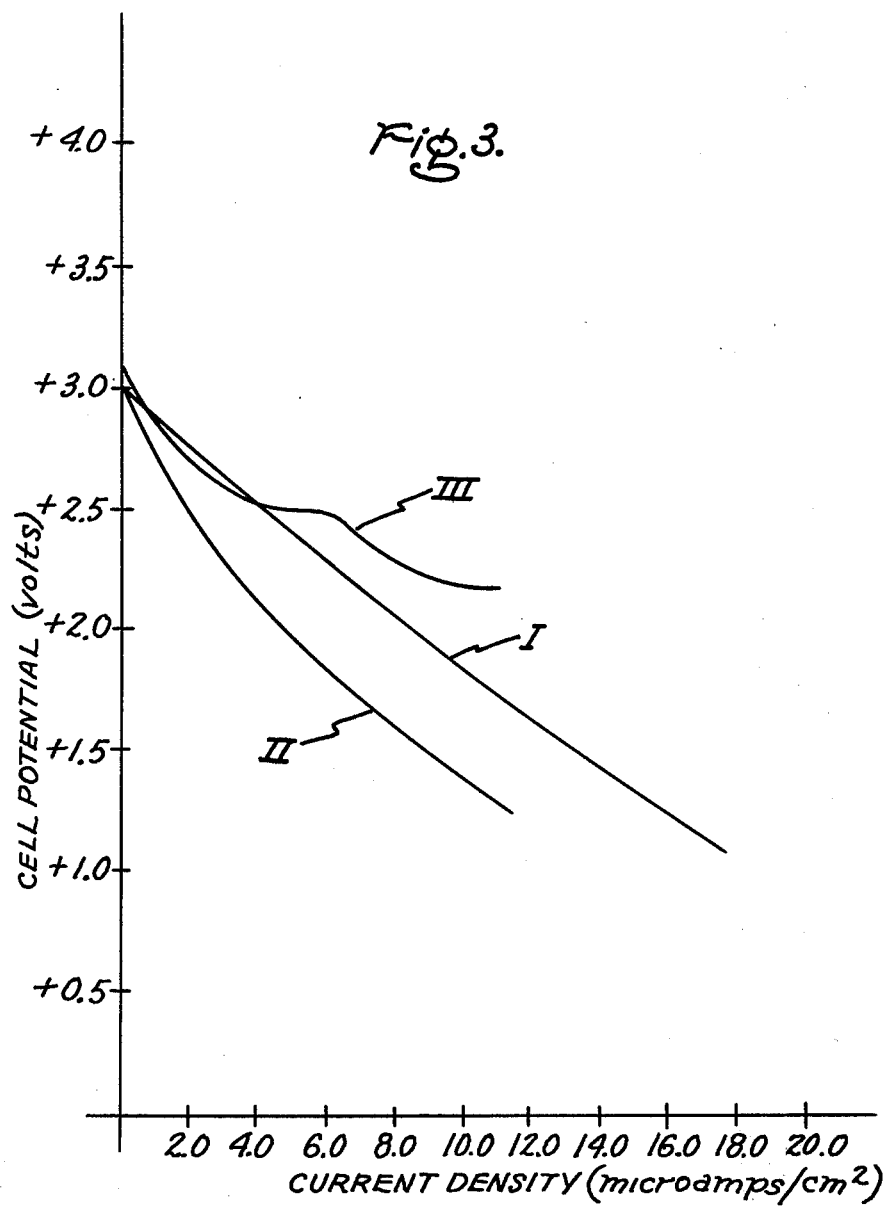

SEALED LITHIUM-PHOSPHOROUS CELL

This invention relates to sealed cells and, more particularly, to such cells employing a lithium anode, a phosphorous cathode, and a solid lithium-sodium aluminate electrolyte.

Cross-reference is made to copending patent applications Serial Nos. 517,511, 517,512 and 517,513 filed Oct. 24, 1974 in the names of Gregory C. Farrington and Walter L. Roth and entitled "Sealed Lithium-Bromine Cell," "Sealed Lithium-Iodine Cell," and "Sealed Lithium-Chlorine Cell," respectively. Cross-reference is made to copending patent applications, Ser. Nos. 557,583, 557,584 filed Mar. 12, 1975 in the names of Walter L. Roth and Gregory C. Farrington and entitled "Sealed Lithium-Reducible Phosphorous Oxyhalide Cell" and "Sealed Lithium-Reducible Sulfur Oxyhalide Cell," respectively. Cross-reference is made to copending patent applications, Ser. Nos. 559,901 and 559,990 filed Mar. 19, 1975 in the names of Walter L. Roth and Gregory C. Farrington and entitled "Sealed Lithium-Reducible Gas Cell" and "Sealed Lithium-Sulfur Monochloride Cell," respectively. Cross-reference is made to copending patent application Ser. No. 571,556 filed Apr. 12, 1975 in the names of Gregory C. Farrington and Walter L. Roth and entitled "Sealed Lithium-Sulfur Cell". All of the copending applications are assigned to the same assignee as the present application.

In Weininger et al. U.S. Pat. No. 3,573,105, there is described a rechargeable nonaqueous alkali metal-halogen electrochemical cell which includes an alkali metal anode, a halogen cathode, a nonaqueous electrolyte, and an ion-permeable barrier to inhibit migration of halogen to the negative electrode between the electrodes. There is no specific lithium-sodium aluminate electrolyte between the electrodes which provides absolute separation between the electrodes including their respective liquid electrolytes or solvents excepting alkali ion transport. The electrolyte of the present invention prevents dendrites from piercing the electrolyte as opposed to the Weininger et al. barrier. The electrolyte of the present invention permits cell operation at temperatures above the polymer barrier stability of Weininger et al.

In Liang U.S. Pat. No. 3,713,897, there are described electrolyte materials for high voltage solid electrolyte battery systems. This patent describes a solid ion-conductive electrolyte material containing lithium iodide, lithium hydroxide and aluminum oxide. This patent does not describe or teach a solid ceramic electrolyte. Our electrolyte is not prone to destruction in nonaqueous solvents as opposed to the Liang patent material.

In "Progress in Solid State Chemistry", No. 7, edited by A. Reiss and J. O. McCaldin, published by Pergamon Press in 1972, there is a Section 5 entitled "β-Alumina Electrolytes" comprising pages 141–175. This Section 5 was authored by J. T. Kummer of the Ford Motor Company. Of particular interest in Section 5 are pages 149–151. On page 149, FIG. 7, equilibria are shown between β-alumina and various binary nitrate melts containing $NaNO_3$ and another metal nitrate at 300°–350° C. It will be noted from FIG. 7 that the equilibration of sodium beta-alumina with molten $LiNO_3$ results in the partial replacement of 50 percent of the sodium ion content by lithium ions. On page 151 it is discussed in lines 1–5 that the equilibration of sodium beta-alumina with molten $LiNO_3$ does not produce a complete replacement of sodium ions by lithium ions. However, it is further pointed out that complete lithium ion replacement of sodium ions in sodium beta-alumina can be effected by first exchanging sodium ions by silver ions and then silver ions by lithium ions in a melt of $LiNO_3$-$LiCl$. Throughout the above Kummer publication there is no recognition that the lithium-sodium β-alumina produced by equilibration of sodium beta-alumina with molten $LiNO_3$ is a unique and stable compound which can readily transport lithium ions without substantially altering its content of sodium ions.

Our present invention is directed to a sealed lithium-phosphorous cell with positive separation of the anode and cathode by a solid lithium-sodium aluminate electrolyte which is lithium ion conductive.

The primary object of our invention is to provide a sealed lithium-phosphorous cell which has high cell voltage, high energy density, a near-zero self discharge rate, exceptionally long storage life, and stability at ambient temperatures.

In accordance with one aspect of our invention, a sealed lithium-phosphorous cell employs a lithium anode, a phosphorous cathode, and a solid lithium-sodium aluminate electrolyte which is a lithium-ion conductor therebetween.

These and various other objects, features and advantages of the invention will be better understood from the following description taken in connection with the accompanying drawing in which:

FIG. 3 is a set of polarization curves showing cell performances of the cell shown in FIGS. 1 and 2.

Figure 1:
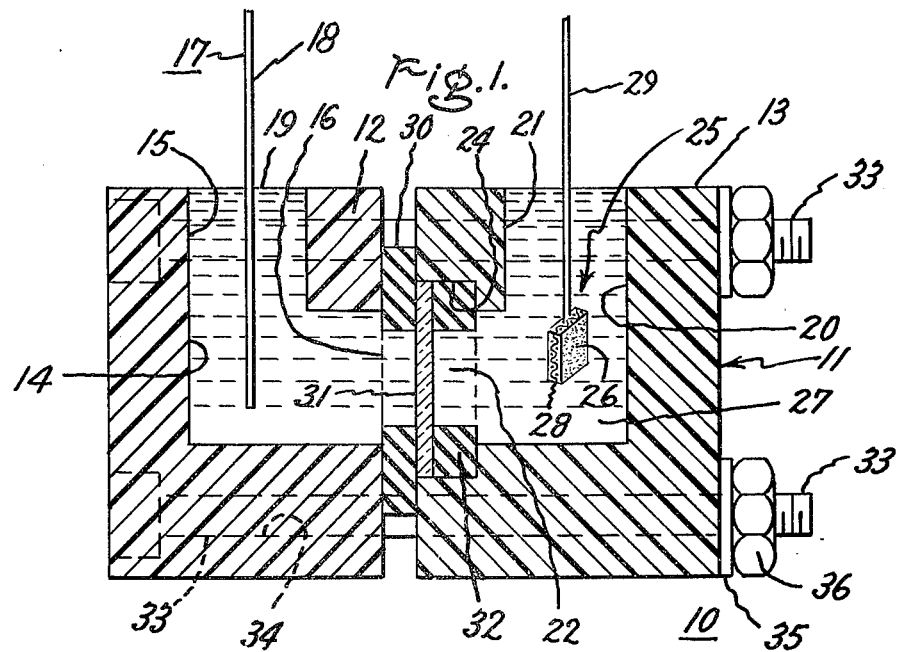
FIG. 1 is a sectional view of a lithium-phosphorus cell made in accordance with our invention.

In FIG. 1 of the drawing, there is shown generally at 10 a lithium phosphorous cell embodying our invention. While we tested this open cell for operability, the cell for general use is sealed. The cell has a two part Teflon polymer casing 11 including an anode portion 12 and a cathode portion 13. Anode portion 12 defines a chamber 14 therein with an upper opening 15. An opening 16 is provided in one side wall. An anode 17 comprises a lithium metal foil 18 in a nonaqueous electrolyte or solvent 19 within chamber 14. Cathode portion 13 defines a chamber 20 therein with an upper opening 21. An opening 22 is provided in one side wall which opening 22 is shown with a first portion 23 and a recessed portion 24. A cathode 25 comprises phosphorous 26 in a nonaqueous solvent 27 with an ionic conductivity enhancing material. Phosphorous 26 is shown pressed onto a nickel screen 28 which is welded to a current collector lead 29. Two part casing 11 has its anode portion 12 and cathode portion 13 positioned adjacent to one another and in communication with one another in a leak-proof manner by aligning openings 16 and 22 and positioning between the two portions a washer 30, for example, of silicone rubber. A solid lithium-sodium aluminate electrolyte 31 in the form of a disc is positioned against the outer surface of washer 30 and the outer surface of a similar silicone washer 32 fitted within recess 24 of opening 22. The two part casing 11 is held together tightly and in a leak-proof fashion by employing a pair of threaded fasteners 33 which extend through an appropriate opening 34 through both parts of casing 11. A washer 35 and a nut 36 are provided for the threaded end of each fastener to position the structure together. The above assembly results in a lithium-phosphorous cell which can be employed as a primary cell.

Figure 2:
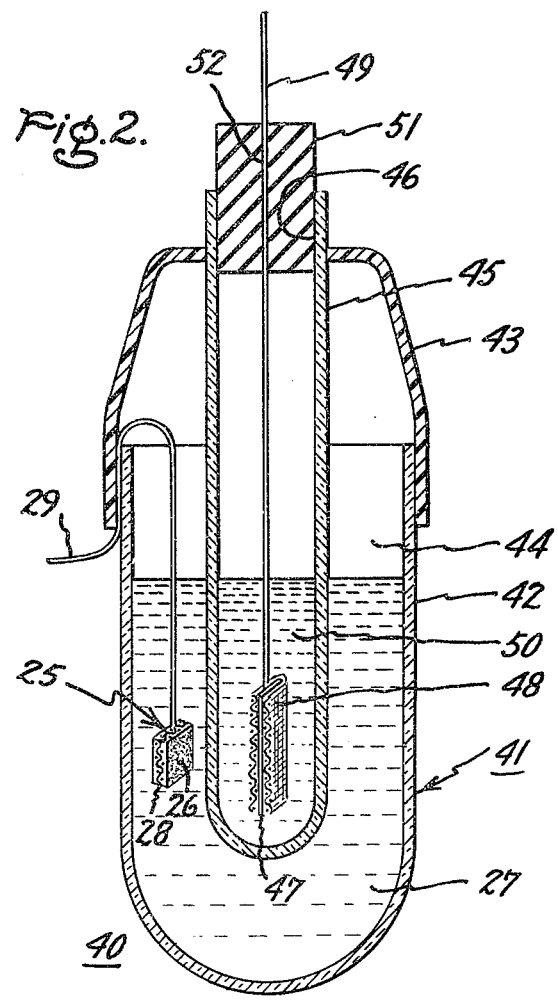
FIG. 2 is a sectional view of a modified lithium-phosphorous cell made in accordance with our invention.

In FIG. 2 of the drawing there is shown generally at 40 a modified sealed lithium-phosphorous cell embodying our invention. An outer casing 41 comprising a lower casing portion 42 of glass and an upper casing portion 43 of polyethylene affixed tightly to the upper open end of the lower casing portion 42 thereby provides a chamber 44 for a cathode 25 of phosphorous 26 in a nonaqueous solvent 27 with an ionic conductivity enhancing material. Phosphorous 26 is shown pressed onto a nickel screen 28 which is welded to a current collector lead 29. Lead 29 extends to the exterior of cell 40 through the junction of the lower and upper casing portions 42 and 43. An inner casing 45 in the form of a tube of solid lithium-sodium aluminate electrolyte is positioned within outer casing 41 and immersed partially in nonaqueous solvent 27. An opening 46 is provided in the top of upper casing portion 43 into which tube 45 fits tightly. An anode 47 of lithium metal in the form of a lithium ribbon pressed onto a nickel mesh 48 which is folded together and attached to the end of a nickel electrical lead 49. An anolyte 50 partially fills tube 45 and is in contact with lithium anode 47. An electrically insulating closure 51 with a hold 52 therethrough is provided at the upper end of tube 45 to seal the initially open end of the tube. Lead 49 extends through hole 52 in closure 51 to the exterior of cell 40.

In FIG. plotted performances of the cells shown in FIGS. 1 and 2, respectively, are provided by polarization curves which were produced at a temperature of 26° C. In this Figure, cell voltage in volts is ploted against current density in microamperes per square centimeter.

We found that we could form a sealed lithium-phosphorous cell with a lithium ion-conductive electrolyte by employing a casing having a cathode portion and an anode portion. These two portions are separated by a solid lithium-sodium aluminate electrolyte in disc or tube form which will be further described below. Such a casing may be provided in various configurations such as for example shown in FIGS. 1 and 2. For purposes of showing the operability of our cell, we used first an anode portion and a cathode portion each of which had top and side openings as shown in FIG. 1. Since it was not necessary, the top openings were not sealed during assembly and testing. The casing material chosen was Teflon polymer. A silicone rubber washer was positioned in the recessed opening of the cathode portion and a solid lithium-sodium electrolyte was positioned adjacent the washer within the recessed opening. A silicone rubber washer was positioned between the casing portions. The side openings of the casing portions and the washers were aligned to provide for contact of the cathode with one surface of the solid electrolyte and for contact of the anode with the other surface of the electrolyte. We employed threaded fasteners to hold the casing portions together in a unitary cell structure. It will, of course, be appreciated that various other cell configurations can be employed, for example, as shown in FIG. 2. In addition to the Teflon polymer casing material various metals and nonmetals can be used. Other materials can be substituted for the silicone washers. If desired, in the configuration, the solid electrolyte disc could be sealed by glass seals to the casing to separate the cathode from the anode as shown, for example, in the above-mentioned U.S. Pat. No. 3,817,790.

We found further that we could form various modified sealed lithium-phosphorous cells embodying our invention. One such modified cell employs an outer casing comprising a lower casing portion of glass and an upper casing portion of a plastic such as polyethylene affixed tightly to the upper open end of the lower casing portion thereby providing a chamber for a cathode of phosphorous in a nonaqueous solvent with an ionic conductivity enhancing material. The phosphorous can be pressed onto a nickel mesh which is immersed in the ionic conductivity enhancing material. A current collector lead which is welded to the screen extends to the exterior of the cell through the junction of the lower and upper casing portions. An inner casing in the form of a tube of solid lithium-sodium aluminate electrolyte is positioned within the outer casing and immersed partially in the nonaqueous solvent with ionic conductivity enhancing material. An opening is provided in the top of the upper casing portion into which the tube fits tightly. An anode of lithium metal in the form such as lithium ribbon pressed onto a nickel mesh is folded together and attached to the end of a nickel electrical lead. An anolyte partially fills the tube and is in contact with the lithium anode. An electrically insulating closure with a hole therethrough is provided at the upper end of the tube to seal the initially open end of the tube. The lead extends through the hole in the closure to the exterior of the cell.

For the anode we employ lithium, lithium as an amalgam or lithium in a nonaqueous electrolyte, such as propylene carbonate. Ionic conductivity enhancing materials can be added to the nonaqueous solvent.

We employ a solid lithium-sodium aluminate electrolyte between the cathode and anode to provide a solid barrier preventing contact between the electrodes and to provide lithium ion-conductivity. The solid lithium-sodium ion-conductive electrolyte has an approximate composition of $LiNaO \cdot 9Al_2O_3$ of which 1.3 to 85 percent of the total alkali content is lithium. As it was discussed above in "Progress and Solid State Chemistry", J. T. Kummer, in Section 5 is described a lithium-sodium, $\beta$-alumina material, particularly on pages 149–151. Further, it is described in the article how to manufacture such material. As it will be particularly noted throughout the above Kummer publication, there is no recognition that the lithium-sodium $\beta$-alumina produced by equilibration of sodium beta-alumina with molten $LiNO_3$ is a unique and stable compound which can readily transport lithium ions. We used such material containing 50 percent lithium ions as a solid electrolyte in our initial cells as shown in FIG. 1 and described above. The results of performance of these cells are shown in FIG. 3. Such electrolyte material containing 50 percent lithium ions appears to be the optimum amount of lithium ions in the material.

A range of 40 to 60 percent lithium ions in the electrolyte material with the remainder sodium ions provides the desirable conductivity for the operation of our cells. We found unexpectedly that we could obtain the desirable conductivity necessary for the operation of our cells by employing a broader range of 1.3 to 85 percent lithium ions in the electrolyte material with the remainder sodium ions. Tubes made of solid lithium-sodium aluminate electrolyte containing, respectively, 1.34 and 84.7 percent sodium ion substitution by lithium ions were used in later cells as shown in FIG. 2 and as described above.

For the cathode, we can employ phosphorous in a nonaqueous solvent with an ionic conductivity enhancing material. Phosphorous is an inexpensive, light (31g/mole) oxidant which exists in many allotropic modifications. The best known modifications are white (yellow) phosphorous, red (violet) phosphorous and black phosphorous. The white form melts at 44.1° C, boils at 280.5° C, dissolves in $CS_2$, benzene, and other organic solvents and reacts readily and violently with oxygen. Red phosphorous, which has a melting point of about 590° C, comprises a number of modifications which are formed by heating white phosphorous to temperatures above 250° C. Red phosphorous is more stable than white phosphorous and with reasonable care can be handled under normal conditions. Black phosphorous is formed by heating white phosphorous at 220° C and 1200 kg/cm$^2$, or by heating to between 220° C and 370° C with mercury on copper as a catalyst in the presence of a black phosphorous seed. The black phosphorous is an excellent conductor of electricity (0.71 ohm-cm at 0° C) and is stable in contact with the atmosphere. When we employ the word phosphorous in the present application and claims, we include all of the above types of phosphorous.

The phosphorous in solid form which is obtained, for example, by pressing onto a screen such as a nickel screen, is immersed in a nonaqueous solvent which solvent does not react with the phosphorous. While various nonaqueous solvents are suitable, we have found propylene carbonate to be a quite satisfactory solvent for the phosphorous. We have found that a satisfactory manner of suspending the phosphorous on a nickel screen in the solvent to be my means of an electric current conductor in the form of a wire which is welded to the screen. The opposite end of the wire can then be extended through the battery casing to the exterior to provide a suitable electrical lead to the cathode. Various ionic conductivity enhancing materials, which are suitable, include chemically stable salts such as tetraalkylammonium perchlorates, terafluoroborates and lithium perchlorate.

Lithium is the lightest practical solid battery anode material and is also the most reducing. The lithium ion is a small and strongly polarizing ion. The salts of the lithium ions are generally more soluble in nonaqueous solvents than their sodium ion counterparts. Such high solubility helps eliminate salt precipitation on the faces of a solid electrolyte. Various other nonaqueous electrolytes which are suitable with lithium include butyrolactone, tetrahydrofuran, acetonitrile, thionyl chloride, phosphorous oxychloride with a wide variety of conductivity salts such as lithium perchlorate, lithium and tetraalkyl-ammonium chlorides, perchlorates, cyanides, thiocyanates, tetrafluoroborates, and hexafluorophosphates.

Examples of lithium-phosphorous cells, which can be readily sealed or are sealed, made in accordance with our invention are set forth below:

EXAMPLE I

One cell, No. I, was assembled as generally described above and shown in FIG. 1 of the drawing. For the cell, a lithium-sodium aluminate electrolyte disc was made by first preparing a cylinder of $\beta$-alumina by firing $Na_2O+Al_2O_3$ plus 1 percent MgO at 1750° C. The density of the $\beta$-alumina cylinder was 3.224 g/cm$^3$ corresponding to less than 1 percent void volume. A disc of 1 mm thickness each was sliced from the cylinder and converted to a lithium-sodium aluminate electrolyte by immersion in molten $LiNO_3$ at 400° C for 24 hours. The exchange of the sodium ions for the lithium ions was accompanied by a 1.91 percent decrease in weight corresponding to approximately 50 percent sodium ion substitution by lithium ions and the final density was 3.148 g/cm$^3$. X-ray diffraction showed that each electrolyte disc has a hexagonal crystal structure with lattice parameters $a = 5.603 \pm 0.001$ A and $c = 22.648 \pm 0.003$ A.

For the cell a two part Teflon polymer casing which included an anode portion and a cathode portion was employed to assemble the cell. Each portion had a chamber with an upper opening and a side opening. The side opening in one portion, the cathode portion, was further recessed. A silicone washer was positioned in the side opening of the cathode portion. The above prepared lithium-sodium aluminate electrolyte disc was positioned against the washer and within the recessed opening in the cathode portion. A silicone washer was positioned between the casing portions and the openings in the washer and in the casing portions were aligned. A pair of threaded fasteners were then employed to hold the casing portions together and tightened at one end by nuts. The chamber of the anode portion for the cell was provided with an anode consisting of an electrolyte of propylene carbonate with dissolved lithium perchlorate and tetrabutylammonium tetrafluoroborate and a lithium foil anode inserted therein and held in position in the chamber and in contact with the electrolyte. A nonaqueous solvent of propylene carbonate containing lithium perchlorate and tetrabutylammonium tetrafluoroborate was placed in the cathode chamber of cell No. I. Phosphorous pressed onto a nickel screen was immersed in the solvent in the cathode chamber resulting in a cathode. The cathode structure was supported by a current collector lead. The resulting device was a lithium-phosphorous cell made in accordance with our invention which cell could be readily sealed. The open circuit voltage of cell No. I was 3.0 volts.

EXAMPLE II

The performance of cell No. I of Example I is shown as curve I in the polarization curves in FIG. 3 of the drawing which was produced at a temperature of 26° C. The cell voltage in volts is plotted against current in microamperes per square centimeter for the cell.

No attempts were made to minimize interfacial polarization at the lithium-sodium aluminate ion-conductive electrolyte interfaces.

EXAMPLE III

Two cells, Nos. II and III, were assembled as generally described above and as shown in FIG. 2 of the drawing. The cells were constructed in the same manner with the exception that one lithium-sodium aluminate tube, No II, had a 84.7 percent lithium ion content while the other lithium-sodium aluminate tube, No. III, had a 1.34 percent lithium ion content. The remaining alkali ion content of the tubes was sodium ions.

The tube for cell No. II was formed from a tube of sodium $\beta$-alumino approximately 6.2 cm. long, 1.1 cm. OD, and 0.15 cm. wall thickness. The tube was baked out overnight at 1175° C prior to lithium ion exchange. The lithium ion exchange was made by immersion in lithium nitrate at 600° C for 13 hours. A resulting 3.12 percent weight decrease corresponded to 84.7 percent sodium substitution by lithium ions.

The tube for cell No. III was formed from an identical sodium β-alumina tube which was baked out in the same manner. The lithium ion exchange was made by immersion in 20 mole percent lithium nitrate and 80 mole percent sodium nitrate at 400° C for 72 hours. A resulting 0.049 percent weight decrease corresponded to 1.34 percent sodium substitution by lithium ions.

For each cell, an outer casing was formed of a lower casing portion of glass and an upper casing portion of polyethylene affixed tightly to the upper open end of the lower casing portion thereby providing a chamber for each cathode which consisted of phosphorous immersed in a nonaqueous solvent of propylene carbonate containing lithium perchlorate and tetrabutylammonium tetrafluoroborate. The phosphorous was pressed onto a nickel screen. An electrical current collector lead was welded to the screen and extended to the exterior of the cell through the junction of the lower and upper casing portions. An inner casing in the form of a tube of solid lithium-sodium aluminate electrolyte was positioned within each outer casing and immersed partially in the nonaqueous solvent. The tube for cell No. II contained 84.7 percent lithium ion content while the tube for cell III contained 1.34 percent lithium ion content. An opening was provided in the top of each upper casing portion into which the respective tube fitted tightly. An anode of lithium metal in the form of a lithium metal ribbon pressed into a nickel mesh was folded together and attached to the end of a nickel electrical lead. An anolyte of 0.1M tetrabutylammonium tetrafluoroborate in propylene carbonate saturated with $LiClO_4$ partially filled each tube and was in contact with the lithium anode. An electrically insulating closure with a hole therethrough was provided at the upper end of each tube to seal the initially open end of the tube. The lead extended through the hole in the closure to the exterior of the cell. These structures resulted in two sealed lithium-phosphorous cells made in accordance with our invention.

EXAMPLE IV

The performance of the cells, Nos. II and III, of Example III, is shown as curves II and III in the polarization curves in FIG. 3 of the drawing which were produced at a temperature of 26° C. The cell voltage in volts is plotted against current in microamperes per square centimeter for each cell.

No attempts were made to minimize interfacial polarization at the lithium-sodium aluminate ion-conductive electrolyte interfaces.

While other modifications of the invention and variations thereof which may be employed within the scope of the invention have not been described, the invention is intended to include such as may be embraced within the following claims.

What we claim as new and desire to secure by Letters Patent of the United States is:

1. A sealed lithium-phosphorous cell comprises a casing, an anode positioned within the casing, the anode selected from the class consisting of lithium, lithium as an amalgam and lithium in a nonaqueous electrolyte, a cathode positioned within the casing, the cathode comprising phosphorous in a nonaqueous solvent with an ionic conductivity enhancing material, and a solid lithium-sodium aluminate electrolyte positioned within the casing between the anode and cathode and in contact with both the anode and cathode, the solid lithium-sodium aluminate electrolyte having an approximate composition of $LiNaO \cdot 9Al_2O_3$ of which 1.3 to 85.0% of the total alkali ion content is lithium.

2. A sealed lithium-phosphorous cell as in claim 1, in which 40 to 60% of the total alkali ion content of the solid lithium-sodium aluminate electrolyte composition is lithium.

3. A sealed lithium-phosphorous cell as in claim 1, in which 50% of the total alkali ion content of the solid lithium-sodium aluminate electrolyte composition is lithium.

* * * * *